Dec. 1, 1970  C. PROCHNOW  3,544,199
PHOTOGRAPHIC CAMERA WITH REVERSIBLE LENS
Filed Aug. 3, 1967  2 Sheets-Sheet 1

United States Patent Office 3,544,199
Patented Dec. 1, 1970

3,544,199
PHOTOGRAPHIC CAMERA WITH
REVERSIBLE LENS
Claus Prochnow, Braunschweig, Germany, assignor to
Rollei-Werke Franke & Heidecke, Braunschweig, Germany, a firm of Germany
Filed Aug. 3, 1967, Ser. No. 664,591
Claims priority, application Germany, Aug. 6, 1966,
R 43,852
Int. Cl. G02b 7/02
U.S. Cl. 350—255
3 Claims

ABSTRACT OF THE DISCLOSURE

There is disclosed a photographic camera adapted to receive and cooperate with a detachable and reversible lens mount. The lens itself (usually comprising a plurality of elements) is placed in the mount so that its principal point (or principal points, if more than one) are non-symmetrical with respect to the means for mounting the lens mount in the two reversed positions on the camera. Thus when the lens mount is mounted in one position on the camera, with one end forwardly, the principal point of the lens will be at one distance from the focal plane of the camera, and when the lens mount is reversed so that the second end of the mount is forwardly, the principal point of the lens will be at a different distance from the focal plane or film plane of the camera.

BACKGROUND OF THE INVENTION

When a lens mount can be mounted in only one position on the camera, with one end always facing forwardly, it is necessary to have a very long travel of focusing movement of the lens mount, toward and away from the focal plane or film plane of the camera, if it is desired to be able to focus the camera for all object distances from infinity to a very near close-up distance. For example, if it is desired to focus the camera on an object at infinity, the principal point of the lens must be at a distance from the focal plane or film plane, equal to the equivalent focal length of the lens. If it is desired to focus on a near object in order to obtain a full size picture thereof (ratio 1:1) the lens must be moved forwardly until its principal point is at a distance from the film plane of twice the equivalent focal length of the lens. If it is desired to take close-ups at a size larger than full size, the lens must be moved still further forwardly.

This results in requiring a very long extensible bellows, when the camera is of the bellows type, or in the use of a special extension to enable the lens to be placed farther forwardly than in the normal position.

The present invention obviates this by using a lens mount in which the lens system is mounted in what may be called a non-symmetrical position, the lens mount being capable of being mounted on the camera in either one of two positions, reversed end for end with respect to each other. When mounted in one position, with one end of the lens system facing forwardly, the principal point of the lens is at one axial distance from the film plane, and when the lens mount is mounted in a reverse position, with the opposite end of the lens system facing forwardly, the principal point of the lens is at a different position from the focal plane or film plane, for any given position of the focusing front member of the camera. Then the focusing movement of the front member is still available to move the lens mount still further forwardly or rearwardly, as may be desired. Thus the focusing range of the front member of the camera can be greatly reduced, with respect to the focusing movement that would be needed to accomplish the same photographic effects if the lens were always mounted in one position with respect to the front member.

BRIEF DESCRIPTION OF THE DRAWINGS

In the accompanying drawings, which are incorporated herein by reference and are an important and material part of the disclosure.

DESCRIPTION OF THE PREFERRED EMBODIMENTS

Figure 1:
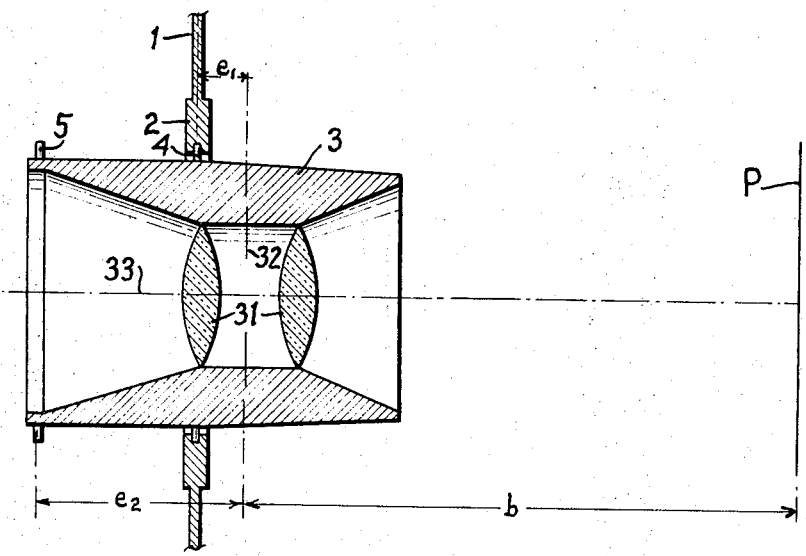
FIG. 1 is a somewhat schematic axial section through a lens mount and a portion of a camera, showing the lens mount in one position relative to the camera.
Figure 2:
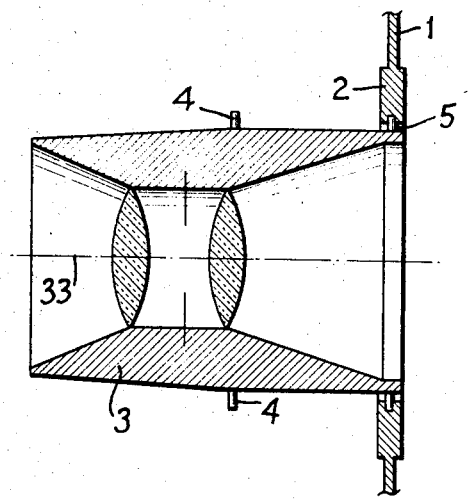
FIG. 2 is a similar view showing the lens mount in a reversed position in comparison to that of FIG. 1.

Referring first to FIGS. 1 and 2, there is shown somewhat schematically a portion 1 of a camera front, movable backwardly and forwardly by conventional known means relative to the picture plane or film plane P. Except for the features herein specifically disclosed, the rest of the camera construction may be of well-known conventional form, the details of which do not constitute part of the present invention.

The front wall 1 of the camera has a socket or mounting ring 2 in which the lens mount 3 may be placed in either one of two positions. The exterior of the mount 3 is so formed that it will engage with and be held by the mounting ring 2. The mounting means may be in the form of conventional screw threads, or of conventional bayonet connection grooves and lugs, the latter being schematically illustrated merely as an example. First mounting means, such as the bayonet lugs 4, are on the exterior of the lens mount 3 at one location, and second mounting means, which may also be in the form of bayonet mounting lugs 5, are on the exterior of the lens mount 3 at a different location spaced axially from the mounting means 4.

Within the tubular mount 3 are the lens elements of any known form and number, the details of which are not important for purposes of the present invention. Two lens elements or components are schematically shown. The important thing is that the principal point of the lens system (this point being, for example, where the transverse plane 32 intersects the optical axis 33) is located non-symmetrical with respect to the mounting means 4 and 5; that is, at a different axial distance from the mounting means 4, than its axial distance from the mounting means 5.

Thus when the interchangeable and reversible lens mount 3 is mounted in the camera front 1 in its first position, by the use of the mounting lugs 4 as shown in FIG. 1, the principal point of the lens will be rearwardly of the front wall 1 by a distance indicated at $e_1$, while the distance of the principal point from the film plane is indicated by the distance $b$. On the other hand, if the lens mount is reversed and is mounted in the camera front 1 by means of the bayonet lugs 5 engaging the mounting ring 2, then the principal point is at a distance $e_2$ forwardly from the camera front 1, instead of a distance $e_1$ rearwardly therefrom, and the distance $b$ from the principal point to the film plane has been considerably increased, without any change in the position of the camera front 1 relative to the film plane P. Hence when the reversible lens mount is mounted in the second position as illustrated in FIG. 2, the lens has an effective position farther forwardly than the position when mounted as in FIG. 1, enabling the camera to take pictures of objects at a closer distance than would be possible in the first mounting position shown in FIG. 2, for any given range of forward and backward focusing movement of the camera front wall 1. The extreme range of movement of the camera lens, relative to the film plane P, is thus the distance $e_1+e_2+$the normal focusing movement distance. If, for example, $e_1=0.3$ of the equivalent focal length of the lens, and $e_2=0.7$ of the equivalent focal length, then it is seen that by simply reversing the lens end for end, the principal point of the lens is moved axially by a distance equal to its equivalent focal length, so that if the camera front were previously positioned for focusing at infinity, with the lens faced in the direction shown in FIG. 1, then when the lens is reversed to the position of FIG. 2 it would be focused for making reproductions at full size or a scale of 1:1.

Figure 3:
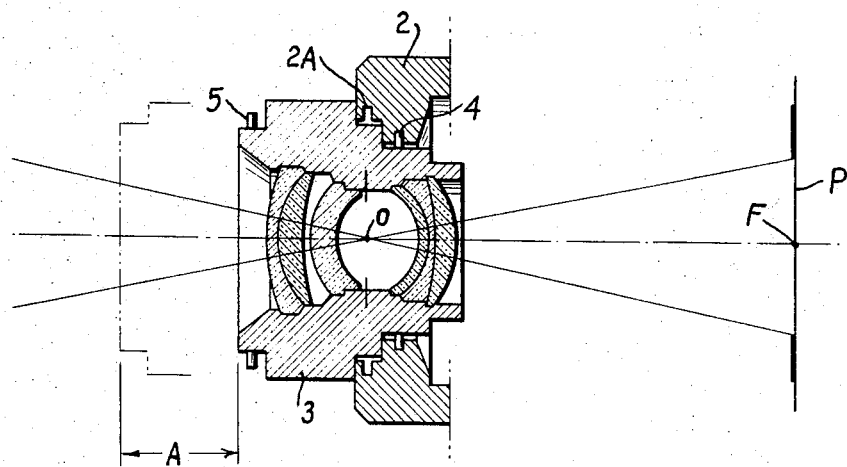
FIG. 3 is a fragmentary axial section through another form of lens mount and a portion of a camera, showing one position of mounting.
Figure 4:
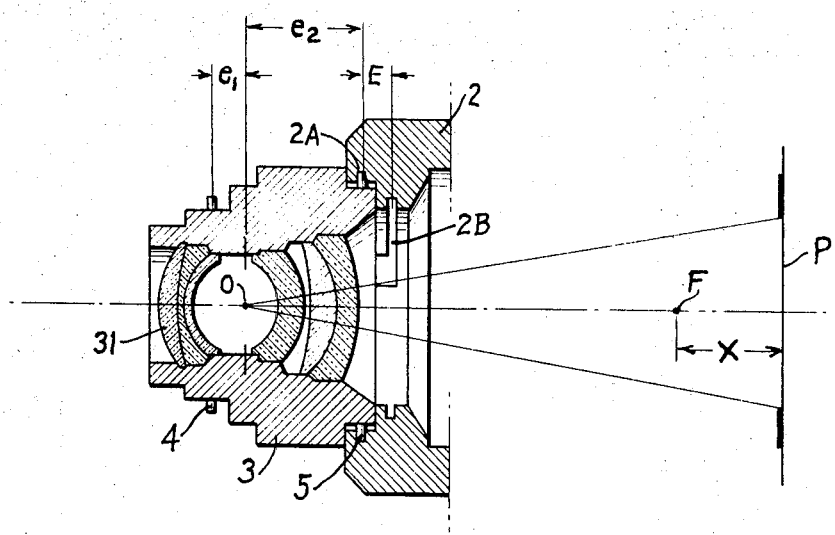
FIG. 4 is a view similar to FIG. 3, showing the mount reversed end-for-end.

FIGS. 3 and 4 illustrate another embodiment constructed according to the same optical principles but with slightly different structural details. In this second embodiment, the camera (except for the features herein specifically mentioned) is of conventional known construction, and carries the mounting ring 2 on the camera front member which is axially movable for focusing in the usual way. Instead of having only a single bayonet slot for use with the two sets of bayonet lugs on the reversible lens mount, the ring in this instance has two sets of bayonet slots, a first set 2A of larger diameter, and a second set 2B of smaller diameter.

In this embodiment, the lens mount 3 is stepped or tapered to provide portions of different external diameters. A portion of smaller diameter is provided with the bayonet lugs 4 for engaging in the smaller diameter bayonet slots 2B of the mounting ring 2. The larger diameter portion of the mount 3 has bayonet lugs 5 for engagement with the larger diameter bayonet slots 2A of the mounting ring 2.

In this case, the principal point of the lens is schematically indicated at O. The axial distance from the principal point to the mounting lugs 4 is indicated at $e_1$; the axial distance from the principal point to the mounting lugs 5 is indicated at $e_2$; and the axial distance between the bayonet mounting slots 2A and 2B is indicated at E. The extent of focusing movement of the mounting ring 2 is indicated at A, and is, of course, the same regardless of which way the lens mount is mounted in the ring 2. This focusing movement A can be provided by a conventional bellows operatively connecting the ring 2 to the camera back containing the film, or in any other conventional way.

Let it be assumed that the lens mount 3 is mounted in the position shown in FIG. 3 with the small end of the lens mount faced rearwardly, and with the smaller diameter bayonet lugs 4 engaged in the rearmost bayonet slots 2B. Let it also be assumed that in this position an object at infinity is focused at the point F, in the film plane. Now if the lens mount 3 is reversed, so that the small end is faced forwardly and the larger diameter lugs 5 are engaged in the bayonet slots 2A, it is seen that the principal point O of the lens has been moved forwardly through a distance X, which is equal to $E+e_2-e_1$. Thus the lens is able to focus on an object at a closer distance to the camera than would be possible when the lens is in the first position shown in FIG. 3.

In order to get the greatest possible benefit from this arrangement, the distance $e_1$ should be kept as small as possible, or even made a negative distance; that is, be placed on the same side of the principal point O as the bayonet lugs 5, as was the case in the first embodiment illustrated in FIGS. 1 and 2. Likewise, the axial distance E between the two sets of bayonet sockets 2A and 2B should be made as great as reasonably possible, having regard to other features of the design, including compactness and attractive appearance of the mounting ring 2, and similar features.

Bayonet connection elements have been mentioned only as a convenient example. Screw threads may be used instead, if desired. Also, this invention may be used in photographic apparatus other than cameras, e.g., projectors, enlargers, and printers.

It is to be understood that the disclosure is given by way of illustrative example only, rather than by way of limitation.

What is claimed is:

1. A photographic camera comprising a camera front member movable axially forwardly and rearwardly relative to a film plane for focusing, and a lens mount detachably mountable in either of two positions on said front member, said front member having a first retaining element of one diameter and a second retaining element of larger diameter coaxial with and spaced axially forwardly from said first element, said lens mount having a lens therein, said lens having a principal point center in a longitudinal direction, said lens mount having a first retaining element of one diameter adapted to mate with and be detachably retained by said first retaining element on said front member when said lens mount is faced in one direction, said lens mount also having a second retaining element of larger diameter adapted to mate with and be detachably retained by said second retaining element on said front member when said lens mount is faced in an opposite direction, said first and second retaining elements on said lens mount being at materially different axial distances from the principal point longitudinal center of the lens so that, for a given position of said camera front member relative to said film plane, the longitudinal center of the lens will be at one axial distance from the film plane when said lens mount is faced in one direction and is mounted on said first retaining element of said front member and will be at a materially different axial distance from the film plane when said lens mount is faced in an opposite direction and is mounted on said second retaining element of said front member.

2. A construction as defined in claim 1, wherein the respective retaining elements on the camera front and the lens mount comprise bayonet connection parts.

3. A construction as defined in claim 1, wherein said retaining elements on the camera front comprise bayonet slots and said retaining elements on said lens mount comprise bayonet lugs.

References Cited

UNITED STATES PATENTS 2,381,228   8/1945   Schmidt   350—255
2,800,052   7/1957   Bechtold   350—230

DAVID SCHONBERG, Primary Examiner

M. J. TOKAR, Assistant Examiner